United States Patent
Schirmer et al.

[11] Patent Number: 6,062,717
[45] Date of Patent: May 16, 2000

[54] CHOPPER MIXING SCREW

[75] Inventors: Henry G. Schirmer, Spartanburg, S.C.; Mitsuzo Shida, Long Grove, Ill.

[73] Assignee: BBS Corporation, Spartanburg, S.C.

[21] Appl. No.: 08/976,138

[22] Filed: Nov. 18, 1997

[51] Int. Cl.[7] .............................. B29B 7/42; B29B 7/58
[52] U.S. Cl. ................................. 366/80; 366/87; 366/90
[58] Field of Search ............................ 366/79–82, 87–90, 366/319, 322; 425/204, 208, 209

[56] References Cited

U.S. PATENT DOCUMENTS

| | | |
|---|---|---|
| 2,765,491 | 10/1956 | Magerkurth . |
| 3,317,956 | 5/1967 | Lippens . |
| 3,486,192 | 12/1969 | Le Roy . |
| 3,572,646 | 3/1971 | Kocher . |
| 3,836,127 | 9/1974 | Csongor . |
| 4,408,887 | 10/1983 | Yamaoka . |
| 4,444,507 | 4/1984 | Dray ........................................ 366/81 |
| 4,447,156 | 5/1984 | Csongor . |
| 4,697,928 | 10/1987 | Csongor . |
| 4,749,279 | 6/1988 | Csongor . |
| 4,900,155 | 2/1990 | Schwarz et al. . |
| 5,318,357 | 6/1994 | Colby et al. ............................. 366/81 |
| 5,348,388 | 9/1994 | Geyer . |
| 5,409,366 | 4/1995 | Vincent . |
| 5,641,227 | 6/1997 | Geyer ........................................ 366/90 |
| 5,855,929 | 1/1999 | Geyer ........................................ 366/80 |

FOREIGN PATENT DOCUMENTS

| | | |
|---|---|---|
| 340 873 | 11/1989 | European Pat. Off. . |
| 197 15 125 | 11/1997 | Germany . |
| 1 556 543 | 11/1979 | United Kingdom . |

OTHER PUBLICATIONS

Bernie Miller, Mixer Adds Dimension to Single–Screw Capability, Plastics World, Mar. 1996.

*Primary Examiner*—Charles E. Cooley
*Attorney, Agent, or Firm*—Pauley Petersen Kinne & Fejer

[57] ABSTRACT

An apparatus and process for chopping and mixing a polymeric material having an elongated hollow barrel element with a material inlet end and a material outlet end and housing a rotatable extruder screw. The rotatable extruder screw includes at least one flightless screw section and at least one stationary tube element made from a bearing material and forming a plurality of serrations at at least one end, the stationary tube element being disposed around the flightless screw section within the elongated hollow barrel element and fixed against rotation with respect to the elongated hollow barrel element. The flightless screw section forms at least one material melt recess in a region corresponding to the serrations of the stationary tube element. Extruded products requiring, and characterized by, low shear, uniform dispersive mixing are made in one process step in a single screw extruder employing this invention.

25 Claims, 10 Drawing Sheets

| SYMBOLS | |
|---|---|
| ⊙ | MELT FLOW OUT |
| → | MELT FLOW OVER |
| X | NO MELT FLOW |

| SYMBOLS | |
|---|---|
| ⊙ | MELT FLOW OUT |
| → | MELT FLOW OVER |
| X | NO MELT FLOW |

CHOPPER MIXING SCREW

BACKGROUND OF THE INVENTION

1. Field of the Invention

This invention relates to an apparatus and process for extruding plastic materials including mixtures of plastic materials, additives, dyes and the like in one step, and more particularly is concerned with an extruder screw for processing mixtures of plastic material and other components utilizing a low shear, discrete dispersive type mixing into final finished products.

2. Description of Prior Art

Mixing a fluid or plastic mass with modifying agents, additives and the like to produce a homogeneous material is typically carried out by mixing apparatuses in various forms known to those skilled in the art. Typically, a conventional extruder screw and barrel apparatus is employed either separately or in conjunction with static flow diverting means. These conventional mixers and extruders are all shear dependent in that flow of plastic material may become channelized with hotter, less viscous material tending to run in channels along the central axis of the extruder section and cooler, more viscous material tending to adhere to portions of the extruder barrel at some points.

For example, with a conventional extruder screw having twenty-four turns, only 80% of the material may be melted by the first twelve turns while the remaining twelve turns produce only a 95% melt. In this case, the more viscous or unmelted material is torn away from the barrel and swept into the die in which forming is to take place. To prevent this, more heating and pressure is applied through the extruder screw resulting in an excessive use of energy and undesirable increase in temperature of material in the barrel, which temperature increase can degrade some portions of the material. Thus, there is a need for an apparatus which is capable of providing a more complete melting and mixing so as to provide a homogeneous molded end product.

U.S. Pat. No. 4,447,156 to Csongor teaches a modular mixing apparatus providing laminar displacement of a fluid mass which is thereafter guided along undulating linear paths of travel of relatively short axial length, which material thereafter undergoes further laminar displacement, which provides a high degree of intimate mixing and blending. The apparatus includes a main shaft which is engaged with a threaded end of an extruder screw and rotatable therewith, spaced apart shear ring elements rotatable with the shaft, and a stationary shearing control sleeve which is located between the shear ring elements disposed around the driver shaft, and fixed to an outer extruder barrel component of the apparatus. See also U.S. Pat. No. 4,697,928 and U.S. Pat. No. 4,749,279, both to Csongor, and both teaching a similar apparatus.

U.S. Pat. No. 2,765,491 to Magerkurth teaches a screw type extruder apparatus for mixing different materials such as rubber particles, oils, and chemicals without employing severe crushing, shearing, or mastication action. U.S. Pat. No. 4,408,887 to Yamaoka teaches a continuous kneader employing a rotary screw shaft rotatable within a cylinder for transporting a fluid axially thereof, rotary discs mounted on the shaft having radial projections and recesses alternately arranged on each side surface thereof, and fixed discs on the cylinder and arranged on the opposite sides of each rotary disc coaxially therewith. An extrusion apparatus for mixing and extruding thermoplastic and rubberlike materials having a rotor member rotatable within the bore of a barrel member is taught by U.S. Pat. No. 5,348,388 to Geyer. U.S. Pat. No. 3,836,127 to Csongor teaches an apparatus for extruding plastic materials having an extruder screw for forming a melted mass which is moved in a helically-directed stream and, at a predetermined point, includes flow diverting means so as to abruptly change the flow pattern. U.S. Pat. No. 3,486,192 to Le Roy teaches an apparatus for the controlled degradation of resinous thermoplastic materials in which the molten resinous material is passed through an extrusion apparatus having at least one special cylindrical or tapered cylindrical circumferential shearing section in the extruder screw arrangement. Input grooves are arranged extending substantially longitudinally in the surface of the special section with groove openings at the input, which grooves terminate in dead ends before reaching the output end of the section. Output grooves arranged between the input grooves extend substantially longitudinally in the surface of the screw section with openings at the output end which terminate in dead ends before reaching the input end of the section. As the section rotates, plastic material is fed under pressure from a prior stage into the input grooves and shears over lands between the grooves thereby shearing the plastic, after which it is passed into the output grooves, through the output openings and into the next conveyor stage. Finally, U.S. Pat. No. 5,409,366 to Vincent teaches a screw processor having means for controlling the generation of shear within the apparatus comprising a housing having at least one screw mounted on a shaft for rotation therein which produces a substantially uniform mix as the material is transported from an inlet to the outlet and a shear force generating device associated with the screw or shaft and located in the region of the outlet, the shear force generating device forming a gap through which material is forced by the screw to exit from the housing, whereby the shearing force applied to the material during passage through the apparatus is concentrated in the shear generating device.

SUMMARY OF THE INVENTION

Accordingly, in contrast to known extrusion devices for mixing of polymeric materials requiring high shear which, in turn, requires excessive use of energy and an undesirable increase in the temperature of the material being processed, it is an object of this invention to provide a chopper screw mixer for mixing of polymeric materials of a low shear, discrete dispersive type mixing which reduces the energy requirements over conventional extruder mixers while providing improved mixing compared to conventional mixers.

This and other objects of this invention are achieved by an apparatus for chopping and mixing a polymeric material comprising an elongated hollow barrel element having a material inlet end and a material outlet end and housing a rotatable extruder screw. The rotatable extruder screw comprises at least one flightless screw section. At least one stationary tube element made from a bearing material and forming a plurality of serrations at at least one end is disposed around the at least one flightless screw section within the elongated hollow barrel element and fixed against rotation with respect to the elongated hollow barrel element. In a region corresponding to the serrations of the stationary tube element, the flightless screw section forms at least one material melt recess. As the screw rotates within the elongated hollow barrel element and, thus, the stationary tube element, the flightless shaft portion within the stationary tube element stabilizes the screw against wobble and wear and provides a cutting or chopping action on the molten polymeric material passing through the serrations into the material melt recess or recesses of the flightless portion of the screw shaft. This cutting or chopping action provides the requisite low shear, discrete dispersive type mixing as each serration of the stationary tube element samples and delivers molten polymeric material from the melt annulus defined by the barrel and screw shaft to the defined material melt recess or recesses on the screw shaft. It will be apparent to those skilled in the art that the rotatable extruder screw may comprise one or a plurality of flightless sections around which are disposed stationary tube elements with serrations at one or both ends.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Figure 1:
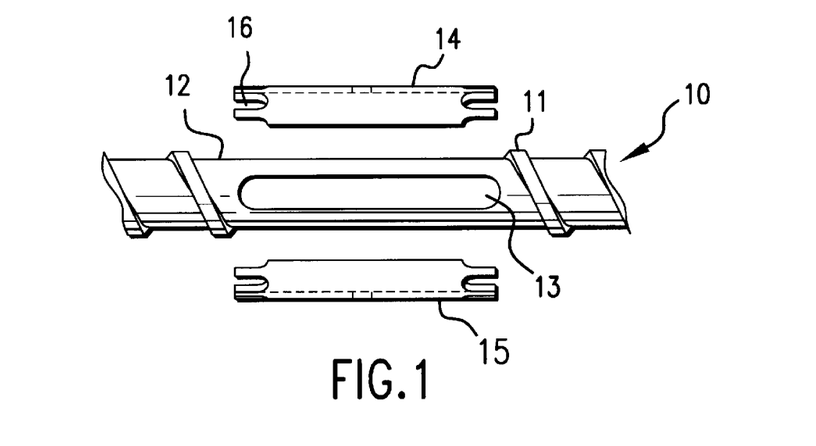
FIG. 1 is an exploded view of a chopper/mixer portion of a rotatable extruder screw in accordance with one embodiment of this invention.
Figure 2:
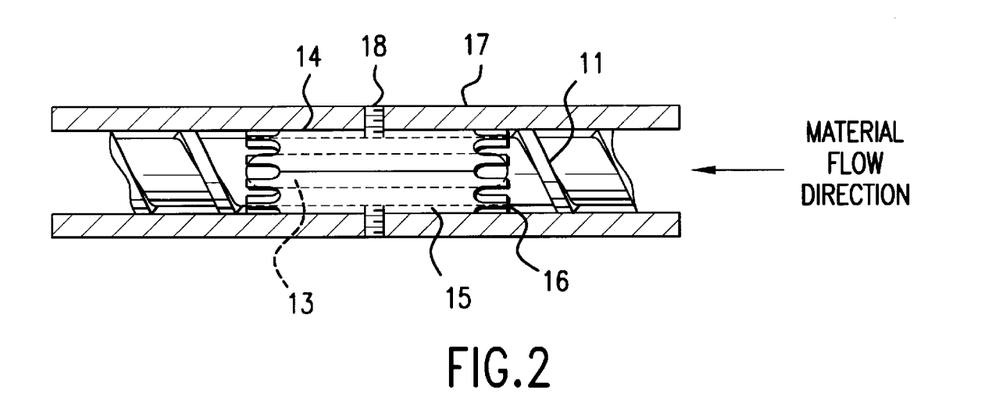
FIG. 2 is a partial cross-sectional side view of a portion of an extruder including a chopper/mixer portion of a rotatable extruder screw in accordance with one embodiment of this invention.

Disclosed herein is an apparatus for chopping and mixing a polymeric material comprising an elongated hollow barrel element having a material inlet end and a material outlet end and housing a rotatable extruder screw. The rotatable extruder screw includes at least one chopper/mixer section as shown in FIG. 1. The rotatable extruder screw 10 comprises a plurality of flights 11 and at least one flightless screw section 12 around which is disposed at least one stationary tube element made from a bearing material and forming a plurality of serrations 16 at at least one end. In accordance with the embodiment shown in FIG. 1, the stationary tube element is formed by two split tube elements 14, 15, each of said split tube elements forming a plurality of serrations 16. Flightless screw section 12 forms at least one material melt recess 13 in a region corresponding at least to the serrations 16 of the at least one stationary tube element 14, 15 so as to enable melted polymeric material traveling along the flighted sections of screw 10 to be cut or chopped by serrations 16 and flow into material melt recess 13. As shown in FIG. 2 stationary, tube element 14, 15 and rotatable extruder screw 10 are disposed within elongated hollow barrel element 17, stationary tube element 14, 15 being fixed against rotation with respect to elongated hollow barrel element 17 by fixing means 18, for example an anchor screw. In accordance with the embodiment shown in FIGS. 1 and 2, serrations 16 are provided at both ends of stationary tube element 14, 15.

Figure 7A:
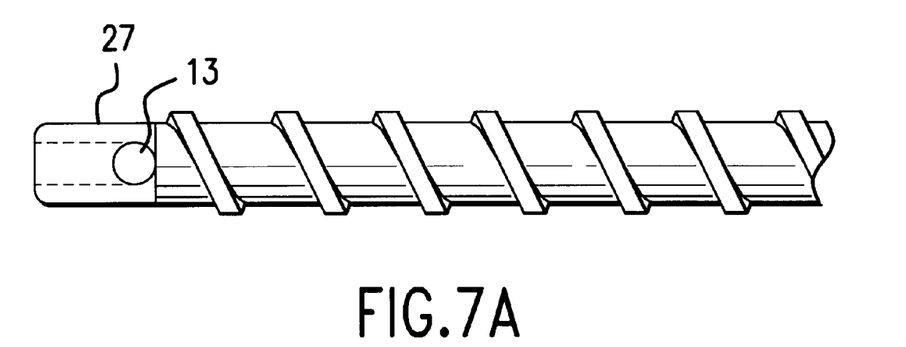
FIGS. 7A and 7B are side view of a chopper tip assembly for a rotatable extruder screw in accordance with one embodiment of this invention.
Figure 7B:
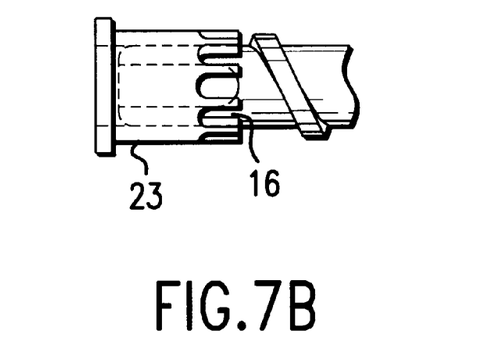
Figure 8:
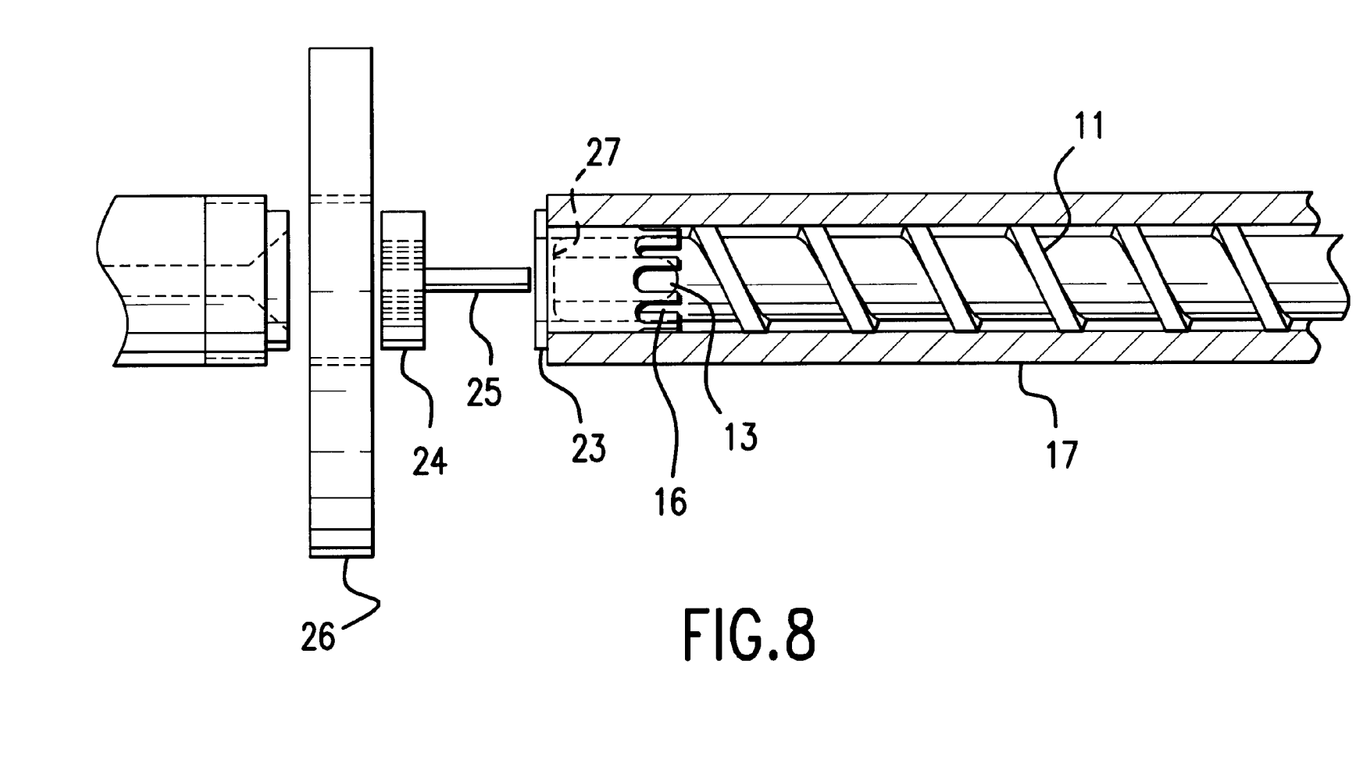
FIG. 8 is an exploded view of a breaker plate mixer with a chopper tip assembly of FIG. 7B.
Figure 9:
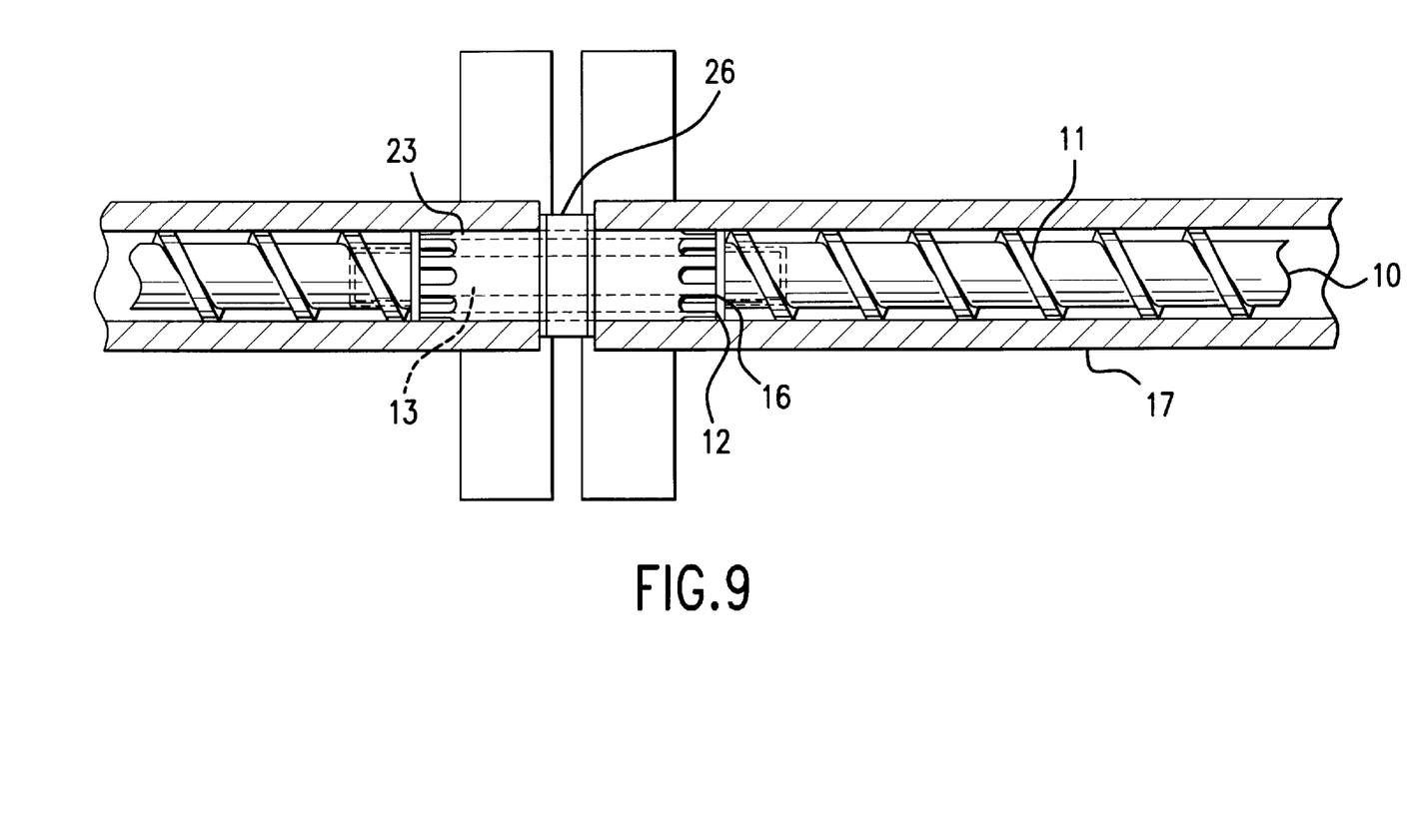
FIG. 9 is a partial cross-sectional side view of a portion of an extruder employing a chopper assembly with a spacer in accordance with one embodiment of this invention.

In accordance with one embodiment of this invention as shown in FIGS. 7A and 7B, the stationary tube element is in the form of an end-piece stationary tube element 23 which forms serrations 16 on one end and is designed to fit around flightless screw tip 27 which forms material melt recess 13. In accordance with one embodiment as shown in FIG. 8, flightless screw tip 27 forms a center hole for receiving breaker plate rod 25 connected to breaker plate 24. FIG. 9 shows a rotatable extruder screw 10 housed within elongated hollow barrel element 17, rotatable extruder screw 10 comprising two screw portions, each of which comprises a chopper tip assembly as shown in FIG. 7B, separated by spacer 26.

Figure 3:
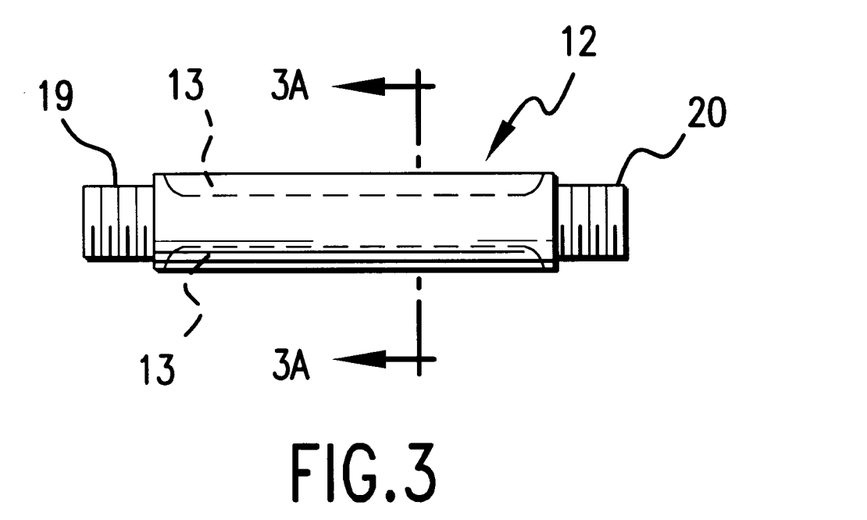
FIG. 3 is a side view of the flightless screw section of a rotatable extruder screw in accordance with one embodiment of this invention.
Figure 3A:
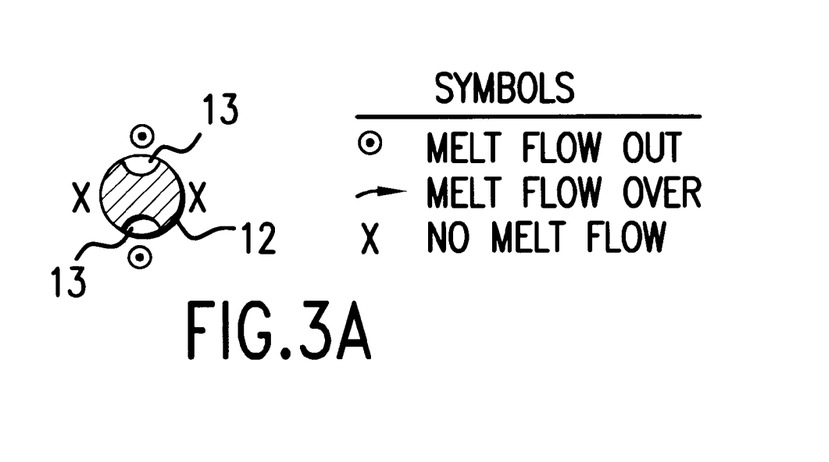
FIG. 3A is a view of the flightless screw section of FIG. 3 taken along line 3A—3A.
Figure 6:
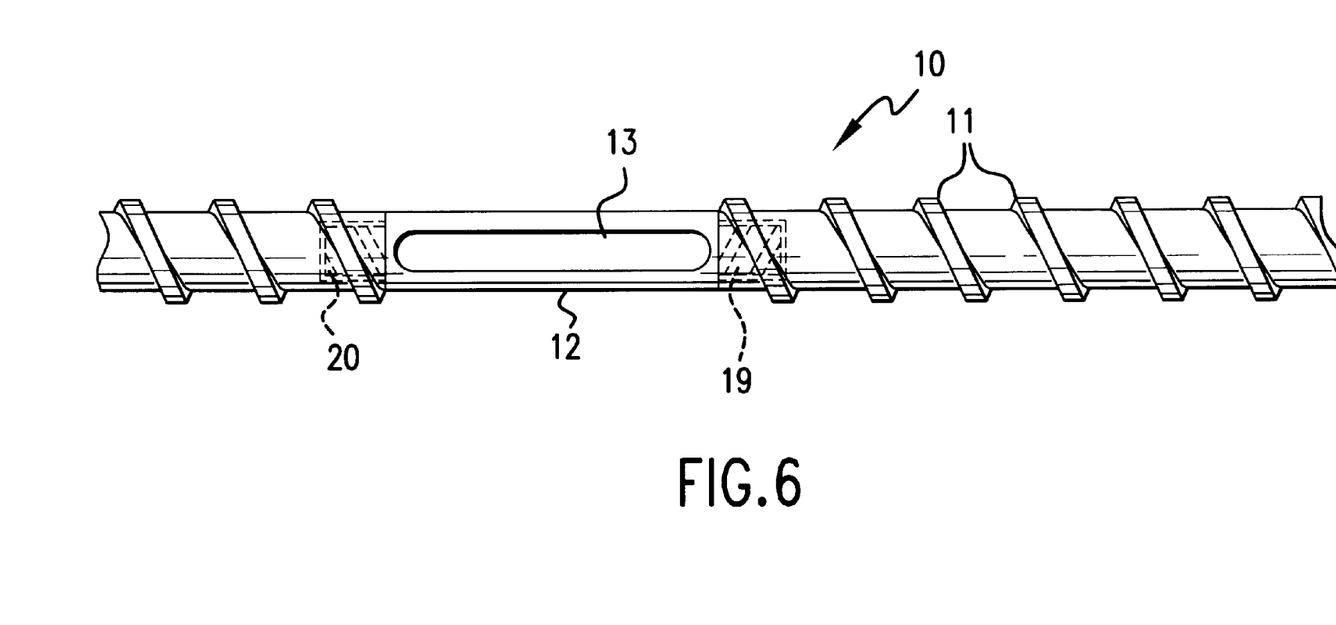
FIG. 6 is a side view of a flightless screw section having threaded ends connecting said flightless screw section to flighted screw sections of a rotatable extruder screw in accordance with one embodiment of this invention.

FIG. 3 shows a flightless screw section of a rotatable extruder screw in accordance with one embodiment of this invention comprising threaded ends 19, 20 for connecting between and to flighted screw sections as shown, for example, in FIG. 6. Flightless screw section 12 in accordance with one preferred embodiment forms a plurality of diametrically opposed material melt recesses 13 through which melted material flows after having been cut by serrations 16 of stationary tube element 14, 15 as shown in FIG. 2. As shown in FIG. 3A, melted material flows through material melt recesses 13 but is prevented from flowing between material melt recesses 13.

Figure 4A:
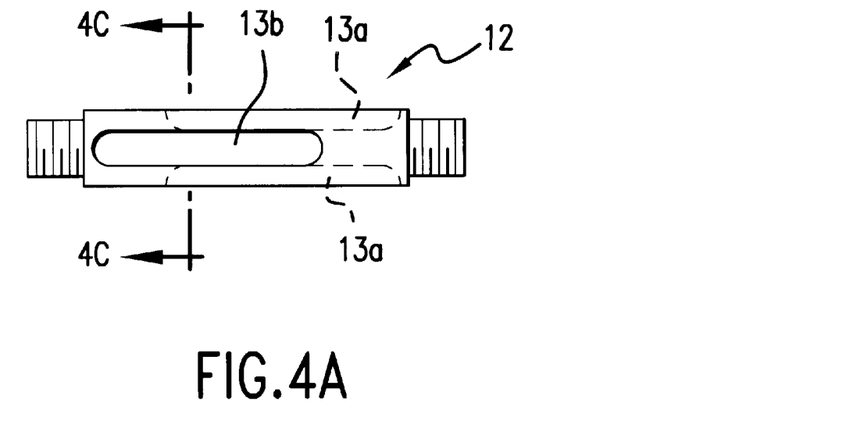
FIGS. 4A and 4B are side views of a flightless screw section of a rotatable extruder screw in accordance with another embodiment of this invention.
Figure 4B:
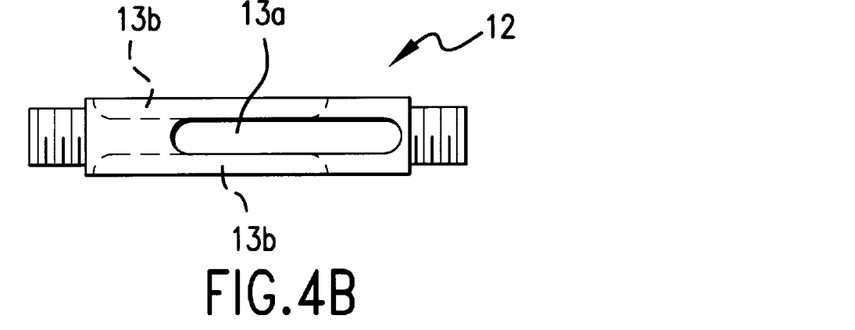
Figure 4C:
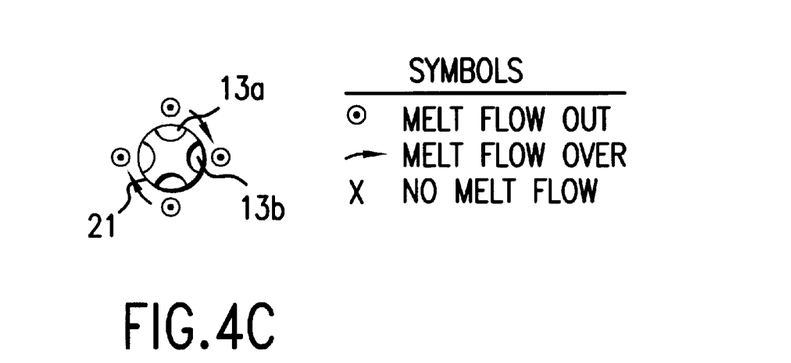
FIG. 4C is a view of the flightless screw section of FIG. 4A taken along line 4B—4B.
Figure 5:
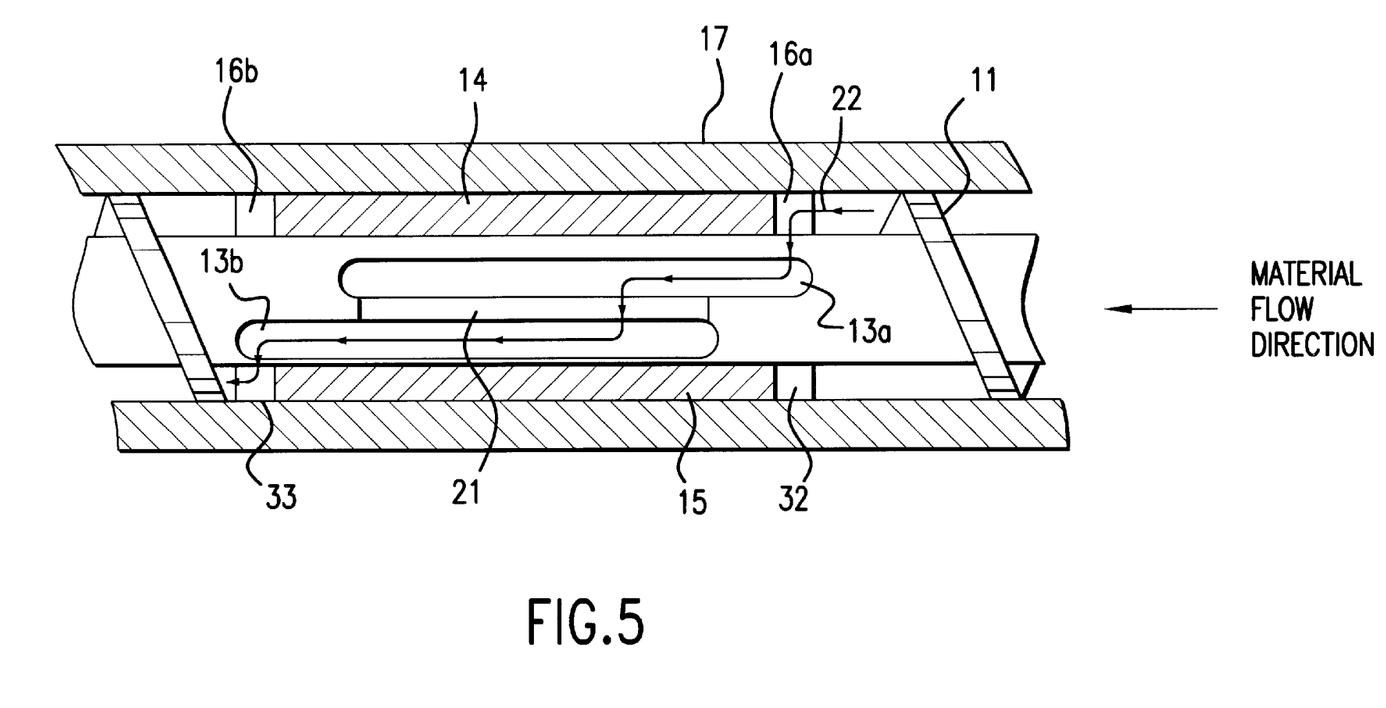
FIG. 5 is a side view of a chopper/mixer portion of a rotatable extruder screw having a flightless screw section with a shear overflow corresponding to the flightless screw section of FIGS. 4A and 4B.

In contrast thereto, in accordance with another embodiment as shown in FIGS. 4A and 4B, flightless screw section 12 forms a first pair of diametrically opposed longitudinally elongated material melt recesses 13a having one end in a region corresponding to serrations 16 at one of the ends of stationary tube element 14, 15 as can be better seen in FIG. 5. Flightless screw section 12 forms a second pair of diametrically opposed longitudinally elongated material melt recesses 13b having one end in the region corresponding to serrations 16 at the other of the ends of stationary tube element 14, 15. Communication means 21, as shown in FIG. 5, is formed by flightless screw section 12 between the first pair of diametrically opposed longitudinally elongated material melt recesses 13a and the second pair of diametrically opposed longitudinally elongated material melt recesses 13b, said communication means conveying melted material from the first pair of diametrically opposed longitudinally elongated material melt recesses 13a to the second pair of diametrically opposed longitudinally elongated material melt recesses 13b. The material melt flow pattern is shown in FIG. 4C and FIG. 5. It will be apparent to those skilled in the art that other configurations of material melt recesses 13a, 13b other than diametrically opposed are possible and such other configurations are considered to be within the scope of this invention.

In accordance with this embodiment as shown in FIG. 5 as indicated by arrows 22, material melt passes through serrations 16a at a material melt inlet end 32 of stationary tube element 14, 15 into material melt recess 13a from which it can only pass through communication means 21 in the form of a machined clearance into material melt recess 13b from which it can exit through the serrations at material melt outlet end 33 of stationary tube element 14, 15. The material melt is thus chopped by a chopping action as it passes through serrations 16a at material melt inlet end 32 of stationary tube element 14, 15; shear mixing occurs within material melt recesses 13a, 13b, and a final chopping of the material melt occurs at material melt outlet end 33 of stationary tube element 14, 15 as the material melt passes through serrations 16b.

Figure 11:
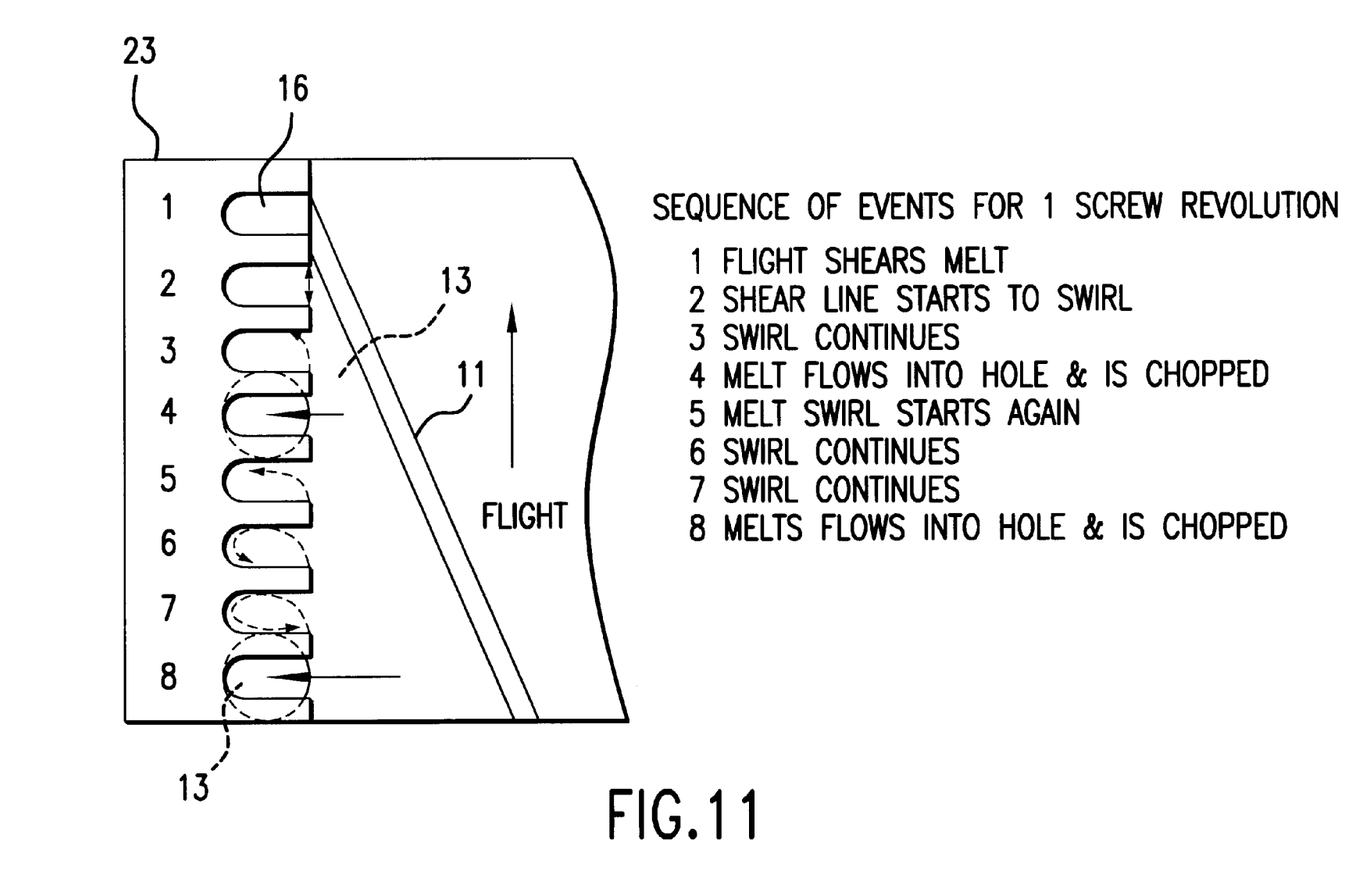
FIG. 11 is a diagram showing the sequence of events with respect to material being processed for one revolution of a rotatable extruder screw utilizing the chopper/mixer of this invention.

FIG. 11 is a diagram showing the sequence of events with respect to material being processed by the chopper/mixer section of the rotatable extruder screw of this invention for one revolution of the rotatable extruder screw. At point 1, flight 11 shears the material melt, which material melt is passing from right to left, and initiates a swirl in the shear line at point 2, which swirl continues as the material passes by point 3. At point 4, material melt flows into material melt recess 13 and is chopped by serrations 16. At point 5, material melt swirl begins again, continuing through a point 6 and point 7. At point 8, the material melt flows into a second material melt recess 13 and is chopped by serrations 16. In order to simplify visualization, the portion of the rotatable extruder screw comprising flights 11 and the end-piece stationary tube element 23 having serrations 16 are flattened. Thus, point 1 is at 0° and point 8 is at 315° with material melt recesses 13 spaced apart by 45°.

In accordance with one embodiment of this invention, end-piece stationary tube element 23 is press fitted to an extension of hollow barrel 17, thereby enabling removal of rotatable extruder screw 10 without running stationary tube element 23. In accordance with this embodiment, the diameter of the flights of rotatable extruder screw 10 is equal to the inside diameter of end-piece stationary tube element 23 and the inside diameter of the barrel extension is larger than the inside diameter of hollow barrel 17.

Figure 10:
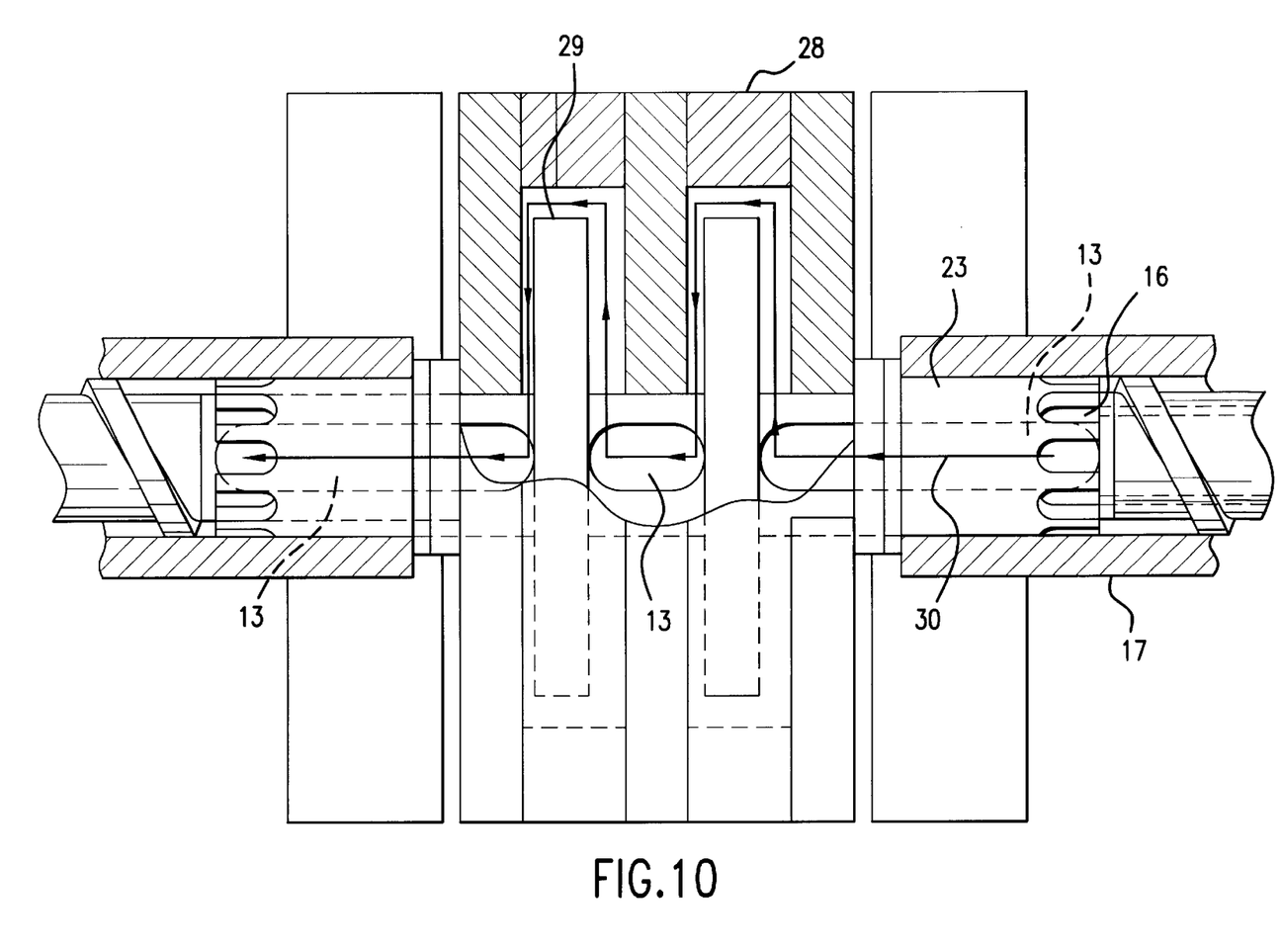
FIG. 10 is a cross-sectional view of a chopper assembly with rotating shear mixing plates for a rotatable extruder screw in accordance with one embodiment of this invention.

In accordance with one embodiment of this invention, the chopper/mixer, as shown in FIG. 10, comprises rotating shear mixing plates 29 disposed within spacer discs 28, thereby providing a material flow path as indicated by arrows 30.

EXAMPLE 1

A 3:1 compression ratio screw with a chopper tip as shown in FIG. 7 comprising a bronze bearing having eight ¼"×¼" serrated slots on one end and two ½ inch receiving holes in the screw tip both employed for this Example. A ½ inch diameter extension was used to produce a rod extrudate and clamp the bearing to the barrel without a breaker plate. At a barrel temperature profile of forward barrel (FB) equal to 400° F., mid-barrel (MB) equal to 375° F., and rear barrel (RB) equal to 350° F., polypropylene 12 MF (melt flow) was extruded at 11 rpm. One red pellet was placed into the hopper purposely maintained at a low pellet level. Melt slugs were collected every thirty seconds. The experiment was repeated three times with the result that six slugs, corresponding to three minutes of extrudate, were pink in color. The chopper bearing was removed from the screw tip and a breaker plate clamped in its place. A repeat of the above procedure produced two dark red slugs, or about one minute of extrudate, thereby demonstrating the substantially poorer mixing obtained without the chopper bearing of this invention.

EXAMPLE 2

The screw of Example 1 was used in a similar experiment, both with and without the chopper tip bearing. A pellet blend of 30% Paxon AA60-003 (0.2 MI (melt index) High Density Polyethylene (HDPE)), Paxon Polymer Co., Baton Rouge, La. and 70% Quantum Petrothene PP-2004MR (12 MF Polypropylene (PP) Quantum Chemical Corporation, Cincinnati, Ohio) was extruded with a two inch blown film die attached to the extension and the film collected. Conditions for this extrusion were as follows: Die temperature= 400° F., FB=450° F., MB=425° F., RB=400° F., screw speed=25 rpm, and film thickness=2.5 mil. The chopper mixing tip of this invention without the breaker plate produced a very fine grained appearing film with slightly larger grains at melt join lines. When the chopper bearing was removed, with the breaker plate in place, the film had a coarse grained appearance with numerous discrete gels, particularly in the melt join areas.

EXAMPLE 3

The blown film experiment of Example 2 was carried out using a red color master batch from Advanced Color Compounding (BA5-100) at 1% pellet blended with PP-2004MR (12 MF PP). Extrusion conditions were the same as in Example 2 and a 2.5 mil film was collected. Surprisingly, the chopper mixing tip, without the breaker plate, produced a film having a non-grainy appearance between melt join lines and a darker shade of pink. When the chopper bearing was removed and the breaker plate inserted, the resulting film was more grainy between melt join lines and had a lighter shade of pink. From this, we conclude that the chopper mixing tip of this invention produced better dispersion of pigment, thereby making more effective use of the color additives.

EXAMPLE 4

A barrel extension and screw addition were assembled as shown in FIG. 9. The screw addition also had a chopper mixing tip as shown in FIG. 7, thereby providing a screw having three chopper sections. The extruder was equipped with a 2" diameter blown film die without a breaker plate. A proprietary color pigment-pellet blend from ChromaColor was used in this Example. In the information accompanying the color pigment-pellet blend, ChromaColor states that the blend can only be homogeneously blended on a twin screw extruder. Extrusion conditions were as follows using the maximum compression ratio of 2:1 throughout the entire screw: die=400° F.; barrel extension=400° F.; FB=400° F., MB=375° F., RB=350° F., and screw speed=2500 rpm. A 2 mil film was blown. The film produced had a uniform pink color without gels or pigment grains.

Another 3:1 compression ratio screw with a barrel plate and no barrel extension was installed in another identical extruder and operated at identical conditions. The resulting film contained discrete pigment particles and produced a grainy and streaked appearance, clearly showing poor dispersion of the pigment.

EXAMPLE 5

The blend of Example 2 was blown into a 2.5 mil film using the triple chopper mixing extruder of Example 4 at the conditions of Example 4. The resulting film had a very fine grained appearance compared to the film of Example 2 and there was no appearance of melt join lines. From this, we conclude that the addition of chopper mixing sections greatly improves the dispersive mixing, and having three sections can give mixing similar to a twin screw extruder.

EXAMPLE 6

Kenstat N100 (a liquid from Kenrich) was pellet blended with ethylene 5% vinyl acetate 2 MI from Rexene polymers at levels of 1%, 2% and 3%, and extruded at the conditions of Example 4. Although stirring to prevent hopper bridging was required at the 3% level, 6 mil film was blown. This was repeated using the identical extruder of Example 4 without a triple chopper-mixing screw. In this case, only the 1% M100 blend was made into a film. Erratic feed and surging prevented making a film using the blend at the 2% and 3% liquid concentrations. From this, we conclude that the low shear, low compression of the triple chopper mixing extruder in accordance with one embodiment of this invention caused less back pressure and permitted positive feeding conditions of pellets with high liquid loadings.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. In an apparatus for chopping and mixing a polymeric material comprising an elongated hollow barrel element having a material inlet end and a material outlet end and housing a rotatable extruder screw, the improvement comprising:

at least one flightless screw section in said rotatable extruder screw; and at least one stationary tube element made from a bearing material and forming a plurality of serrations at at least one end, said at least one stationary tube element disposed around said at least one flightless screw section within said elongated hollow barrel element and fixed against rotation with respect to said elongated hollow barrel element;

said at least one flightless screw section forming at least one material melt recess extending longitudinally along said at least one flightless screw section from a region corresponding to said serrations of said at least one stationary tube element.

2. An apparatus in accordance with claim 1, wherein said at least one stationary tube element forms said plurality of serrations at both ends.

3. An apparatus in accordance with claim 2, wherein said at least one material melt recess corresponds in length to the length of said at least one stationary tube element.

4. An apparatus in accordance with claim 2, wherein said at least one flightless screw section forms a first pair of said material melt recesses, longitudinally elongated and spaced apart and having one end in said region corresponding to said serrations at one of said ends of said at least one stationary tube element, a second pair of said longitudinally elongated said material melt recesses alternatingly disposed with respect to said first pair of spaced apart longitudinally elongated said material melt recesses having one end in said region corresponding to said serrations at the other of said ends of said at least one stationary tube element, the lengths of said longitudinally elongated material melt recesses being less than the length of said at least one stationary tube element, and communication means between said first pair of said longitudinally elongated material melt recesses and said second pair of said longitudinally elongated material melt recesses for conveying said polymeric material from said first pair of said longitudinally elongated material melt recesses to said second pair of said longitudinally elongated material melt recesses.

5. An apparatus in accordance with claim 1, wherein said rotating extruder screw comprises a plurality of screw segments.

6. An apparatus in accordance with claim 5, wherein said at least one flightless screw section comprises threaded means for connecting at least one end of said at least one flightless screw section to an adjacent said screw segment.

7. An apparatus in accordance with claim 1, wherein said at least one stationary tube element is prevented from rotating with respect to said elongated hollow barrel element by an anchor screw in a wall of said elongated hollow barrel element.

8. An apparatus in accordance with claim 1, wherein said flightless screw section corresponds to a screw tip of said rotating extruder screw at said material outlet end of said elongated hollow barrel element.

9. An apparatus in accordance with claim 8, wherein a breaker plate rod connected to a breaker plate is inserted within a center hole formed by said screw tip of said rotating extruder screw.

10. An apparatus in accordance with claim 1, wherein said at least one stationary tube element is formed by two longitudinally split tube elements.

11. An apparatus in accordance with claim 1, wherein said at least one flightless screw section comprises a plurality of spaced apart shear plates.

12. An apparatus in accordance with claim 1 further comprising at least one spacer disk around said at least one flightless screw section, said at least one spacer disk defining a melt shearing passageway.

13. A chopper/mixer screw for mixing polymeric materials in an extrusion apparatus comprising:

a rotatable screw having at least one flightless screw section; and at least one stationary tube element made from a bearing material and forming a plurality of serrations at at least one end, said at least one stationary tube element disposed around said at least one flightless screw section and fixable against rotation with respect to a screw housing, said rotatable screw being rotatable within said stationary tube element;

said at least one flightless screw section forming at least one material melt recess extending longitudinally along said at least one flightless screw section from a region corresponding at least to said serrations of said at least one stationary tube element.

14. A chopper/mixer screw in accordance with claim 13, wherein said at least one stationary tube element forms a plurality of serrations at both ends.

15. A chopper/mixer screw in accordance with claim 14, wherein said at least one material melt recess corresponds in length to the length of said at least one stationary tube element.

16. A chopper/mixer screw in accordance with claim 14, wherein said at least one flightless screw section forms a first pair of spaced apart longitudinally elongated said material melt recesses having one end in said region corresponding to said serrations at one of said ends of said at least one stationary tube element, a second pair of said longitudinally elongated said material melt recesses alternatingly disposed with respect to said first pair of spaced apart longitudinally elongated said material melt recesses having one end in said region corresponding to said serrations at the other of said ends of said at least one stationary tube element, the lengths of said longitudinally elongated material melt recesses being less than the length of said at least one stationary tube element, and communication means between said first pair of said longitudinally elongated material melt recesses and said second pair of said longitudinally elongated material melt recesses for conveying said polymeric material from said first pair of said longitudinally elongated material melt recesses to said second pair of said longitudinally elongated material melt recesses.

17. A chopper/mixer screw in accordance with claim 13, wherein said rotatable screw comprises a plurality of screw segments.

18. A chopper/mixer screw in accordance with claim 17, wherein said at least one flightless screw section comprises threaded means for connecting at least one end of said at least one flightless screw section to an adjacent said screw segment.

19. A chopper/mixer screw in accordance with claim 13, wherein said flightless screw section corresponds to a screw tip of said rotatable screw.

20. A chopper/mixer screw in accordance with claim 19, wherein a breaker plate rod connected to a breaker plate is inserted within a center hole formed by said screw tip of said rotatable screw.

21. A chopper/mixer screw in accordance with claim 13, wherein said at least one stationary tube element is formed by two longitudinally split tube elements.

22. A chopper/mixer screw in accordance with claim 13, wherein said at least one flightless screw section comprises a plurality of spaced apart shear plates.

23. A chopper/mixer screw in accordance with claim 13 further comprising at least one spacer disk around said at least one flightless screw section, said at least one spacer disk defining a melt shearing passageway.

24. A process for producing extruded films and other finished products directly from a material mixture comprising at least one of a plastic material, alloy and blend and at least one of a solid and a liquid, said material mixture requiring a high degree of low shear, uniform, dispersive mixing, the process comprising the single step of conveying said material mixture through a single screw extruder comprising a chopper/mixer screw in accordance with claim 13.

25. A process in accordance with claim 24, wherein said screw has a compression ratio less than or equal to about 2:1.

* * * * *